US008885937B2

(12) United States Patent
Yi et al.

(10) Patent No.: US 8,885,937 B2
(45) Date of Patent: Nov. 11, 2014

(54) EXPOSURE MEASURING METHOD AND APPARATUS BASED ON COMPOSITION FOR AUTOMATIC IMAGE CORRECTION

(71) Applicant: NHN Corporation, Seongnam-si (KR)

(72) Inventors: Jowon Yi, Seongnam-si (KR); Sung Tak Cho, Seongnam-si (KR); Joon-kee Chang, Seongnam-si (KR); Rockyou Park, Seongnam-si (KR); Young Dong Jung, Seongnam-si (KR); Yeontae Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 18 days.

(21) Appl. No.: 13/705,711

(22) Filed: Dec. 5, 2012

(65) Prior Publication Data

US 2013/0202206 A1 Aug. 8, 2013

(30) Foreign Application Priority Data

Feb. 6, 2012 (KR) ........................ 10-2012-0011874

(51) Int. Cl.
*G06K 9/00* (2006.01)
*G06K 9/66* (2006.01)
*G06T 5/00* (2006.01)
*G06K 9/46* (2006.01)
*G06T 5/40* (2006.01)

(52) U.S. Cl.
CPC ................ *G06K 9/4642* (2013.01); *G06T 5/00* (2013.01); *G06T 2207/10004* (2013.01); *G06T 5/009* (2013.01); *G06T 5/40* (2013.01)
USPC .......................................... 382/168; 382/195

(58) Field of Classification Search
None
See application file for complete search history.

(56) References Cited

U.S. PATENT DOCUMENTS

| 5,629,752 | A   | * | 5/1997  | Kinjo ............................... 355/35 |
| 7,336,849 | B2  | * | 2/2008  | Wu ................................. 382/274 |
| 7,894,687 | B2  | * | 2/2011  | Kubo et al. ..................... 382/274 |
| 8,325,998 | B2  | * | 12/2012 | Yang et al. ..................... 382/118 |
| 2004/0190789 | A1 | * | 9/2004 | Liu et al. ........................ 382/274 |
| 2005/0254723 | A1 | * | 11/2005 | Wu ................................. 382/274 |
| 2008/0187187 | A1 | * | 8/2008 | Tezuka ........................... 382/118 |
| 2009/0052801 | A1 | * | 2/2009 | Utsugi ............................ 382/275 |
| 2011/0293014 | A1 |   | 12/2011 | Nakagami et al. |

FOREIGN PATENT DOCUMENTS

| JP | 2002-223387   | 8/2002  |
| JP | 2002-314874   | 10/2002 |
| JP | 2003-036438   | 2/2003  |
| JP | 2003-302669   | 10/2003 |
| JP | 2004-259177   | 9/2004  |
| JP | 2005-348081   | 12/2005 |
| KR | 10-2011-0126616 | 11/2011 |

OTHER PUBLICATIONS

Japanese Office Action issued Nov. 12, 2013, in corresponding Japanese patent application 2013-002168.

* cited by examiner

*Primary Examiner* — Andrae S Allison
(74) *Attorney, Agent, or Firm* — Greer Burns & Crain Ltd.

(57) ABSTRACT

Provided is a composition-based exposure measuring method and apparatus for measuring an exposure degree of an object included in an image, including: receiving an input of the image; measuring an exposure amount of a pixel located in a region determined based on a composition, among pixels of the received image; and determining the exposure degree of the object based on the measured exposure amount.

18 Claims, 11 Drawing Sheets

EXPOSURE MEASURING METHOD AND APPARATUS BASED ON COMPOSITION FOR AUTOMATIC IMAGE CORRECTION

CROSS-REFERENCE TO RELATED APPLICATION

This application claims priority from and the benefit of Korean Patent Application No. 10-2012-0011874, filed on Feb. 6, 2012, which is hereby incorporated by reference for all purposes as if fully set forth herein.

BACKGROUND OF THE INVENTION

1. Field of the Invention

Exemplary embodiments of the present invention relate to a method and apparatus for measuring, based on a composition for automatic image correction, the exposure degree of an object included in an image to automatically correct the image.

2. Discussion of the Background

When human eyes observe a visual image, unlike a camera, the eyes tend to focus on a particular portion or object of the entire image. That is, a human visual cognitive system tends to repeat focusing on and recognizing one object or portion at a sight and accumulate the recognized objects or portions to collectively constitute one image in the brain of the observer.

On the other hand, a camera uses a single lens. Therefore, to render an image taken by a camera in a similar manner to the human recognition system, the taken image needs to be divided into multiple portions or objects and then integrated when being corrected, rather than being corrected with respect to the entire image.

However, because the exposure degree of the pixels constituting an image is conventionally measured with respect to the entire region of the image for image correction, accuracy in measuring the exposure degree with respect to the object is not satisfactory. Generally, exposure refers to transmission of light that falls on a camera film where an image is formed. An exposure degree (or amount) refers to the level of brightness of the image, determined by transmission of light.

It is believed that, for more accurate image correction, the exposure degree of a main object included in an image needs to be measured. However, the process for finding the main object in the image demands high central processing unit (CPU) cost. Furthermore, when finding the object, even a region other than the object may erroneously be recognized as the object.

For example, according to a method for detecting an object by detecting high-frequency components, which are regions with a high change rate, as disclosed in KR Patent Application Publication No. 10-2011-0126616 (published on Nov. 23, 2011 and entitled "Image Processing Device and Method"), not only an object 110 but also a region 120 including high frequency components, such as the background, may be detected as an object as shown in FIGS. 1A and 1B. In this case, image correction may not be accurately performed.

SUMMARY OF THE INVENTION

Exemplary embodiments of the present invention provide an exposure measuring method and apparatus based on a composition for automatic image correction, which is capable of improving accuracy in image correction by measuring the exposure degree of an object more accurately.

Additional features of the invention will be set forth in the description which follows, and in part will be apparent from the description, or may be learned by practice of the invention.

An exemplary embodiment of the present invention discloses a composition-based exposure measuring method and apparatus that uses a computer processor for measuring an exposure degree of an object included in an image, including: receiving an input of the image; measuring an exposure amount of a pixel located in a region determined based on a composition, among pixels of the received image; and determining the exposure degree of the object based on the measured exposure amount.

Another exemplary embodiment of the present invention discloses a non-transitory computer-readable recording medium comprising an executable program which when executed, causes performance of the following steps: receiving an input of an image; measuring an exposure amount of pixels located within a region determined based on a composition among pixels of the input image; and determining an exposure degree of the object based on the measured exposure amount.

Yet another exemplary embodiment of the present invention discloses a composition-based exposure measuring apparatus to measure an exposure degree of an object included in an image, the apparatus comprising: an image input unit configured to receive an input of the image; an exposure amount measuring unit configured to measure an exposure amount of pixels located within a region determined based on a composition among pixels of the input image; a data storage device configured to store information of the measured exposure amount; and an exposure degree determining unit configured to determine an exposure degree of the object based on the measured exposure amount.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
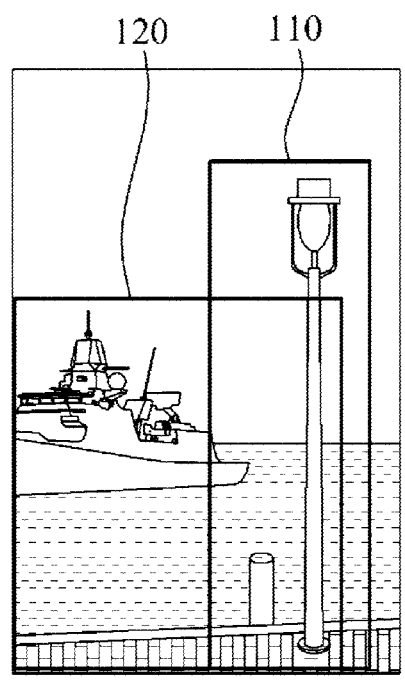
FIGS. 1A and 1B are diagrams illustrating an example in which an object is erroneously detected.
Figure 1B:
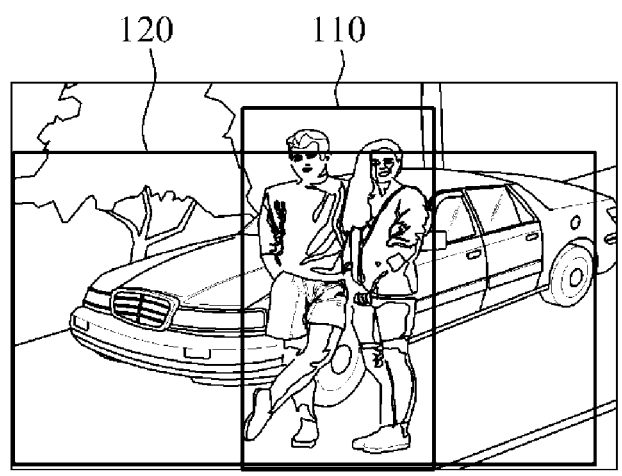

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element is referred to as being "connected to" another element, it can be directly connected to the other element, or intervening elements may be present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
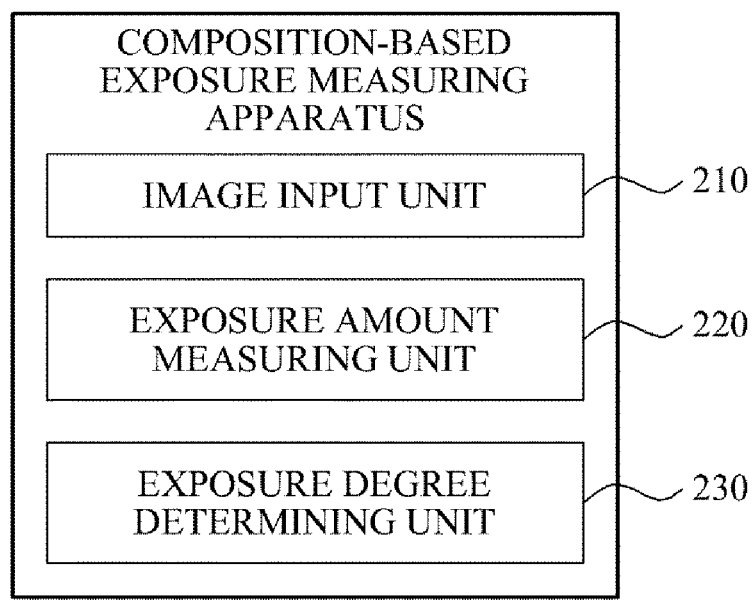
FIG. 2 is a block diagram illustrating a composition-based exposure measuring apparatus according to an embodiment of the present invention.

FIG. 2 is a block diagram illustrating a composition-based exposure measuring apparatus 200 according to an exemplary embodiment of the present invention.

Referring to FIG. 2, the composition-based exposure measuring apparatus 200 may include an image input unit 210, an exposure amount measuring unit 220, and an exposure degree determining unit 230.

In accordance with an exemplary embodiment, the image input unit 210 may receive the input of an image to be compensated according to the exposure level of an object in the image.

The exposure amount measuring unit 220 may measure the exposure amount of pixels located within a region determined based on a composition among the pixels of the image input on the image input unit 210.

The exposure degree determining unit 230 may determine the exposure degree of the object based on the exposure amount measured by the exposure amount measuring unit 220.

The exposure measuring apparatus 200 according to the present exemplary embodiment can compensate the image more accurately by measuring the exposure degree of the object included in the image based on the composition. In visual arts, a composition refers to the disposition or arrangement of visual elements. Unlike in a painting, the composition in a photo is determined by the objects that are fixed on the photo. However, in both a painting and a photo, many composition rules are used to emphasize the subject of the painting or the photo. There are general painting or photo composition rules although they are not an absolute requirement for a painting or photo. Most people take these photo composition rules into consideration when taking a photo.

As a representative example, the composition of a photo may be a circular composition, a triangular composition, a horizontal composition, a diagonal composition, and the like which are used when an object is disposed in the center of a frame. The foregoing compositions focus the sight of the viewer on the center of the image. These examples are illustrative only and not restrictive in any sense. In other examples, any suitable compositions may be used for exposure measurements and image corrections according to embodiments of the present invention. Another example is a golden-section composition, which is, a trisection composition. The golden-section composition divides the frame into three equal parts by imaginary lines in the horizontal direction and in the vertical direction, respectively, and disposes the object on the imaginary lines. Alternatively, according to the golden-section composition, the impressive points of the image are disposed on the four corners at which the imaginary lines intersect.

Among the aforementioned various compositions, many people tend to use the circular composition or the golden-section composition, either consciously or unconsciously, when taking a portrait photo. In fact, according to a random sampling of 100 photos out of 5094 photos, an object is disposed according to those compositions in about 88% of the photos.

Therefore, since it is highly likely that an object is disposed in or on a composition line in the input image, the composition-based exposure measuring apparatus 200 may determine the exposure degree of the object based on the exposure level of the pixels located in or on the composition line.

Figure 3A:
FIGS. 3A and 3B are diagrams illustrating an elliptical weight exposure measuring method according to an embodiment of the present invention.
Figure 3B:
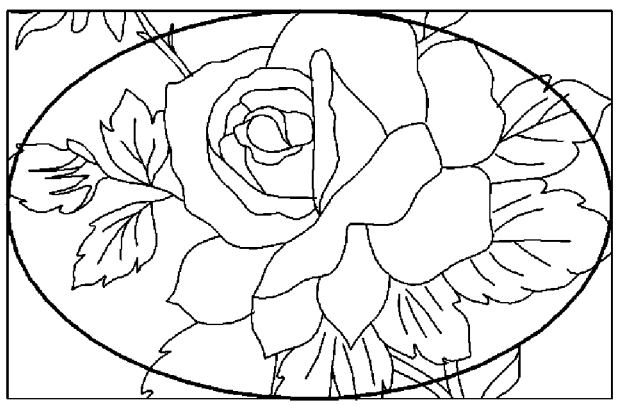
Figure 4:
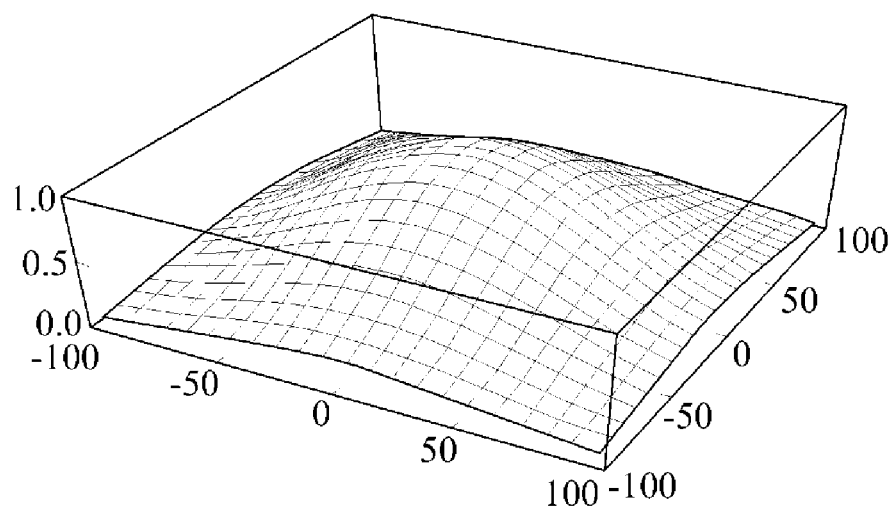
FIG. 4 is a diagram illustrating Gaussian distribution weighting according to distances from the center of the image to pixels, according to an embodiment of the present invention.

FIGS. 3A and 3B are diagrams illustrating an elliptical weight exposure measuring method according to an exemplary embodiment of the present invention. FIG. 4 is a diagram illustrating Gaussian distribution weighting according to distances from the center of an image to pixels, according to an exemplary embodiment of the present invention. Hereinafter, the elliptical weight exposure measuring method will be described in detail with reference to FIGS. 3A, 3B, and 4.

For example, the exposure amount measuring unit 220 may measure the exposure amount with respect to an elliptical region, which is set according to the image size and based on at least one of a triangular composition, an inverted triangular composition, and a circular composition, as shown in FIGS. 3A and 3B. In this case, the exposure amount measuring unit 220 may calculate a histogram by assigning a weight to each pixel based on the Gaussian distribution weighting, as shown in FIG. 4, according to distances from the center of the image to the individual pixels included in the elliptical region. Next, the exposure amount measuring unit 220 may measure the exposure amount of each pixel based on the ratio of a bright area and a dark area in the calculated histogram.

Figure 5A:
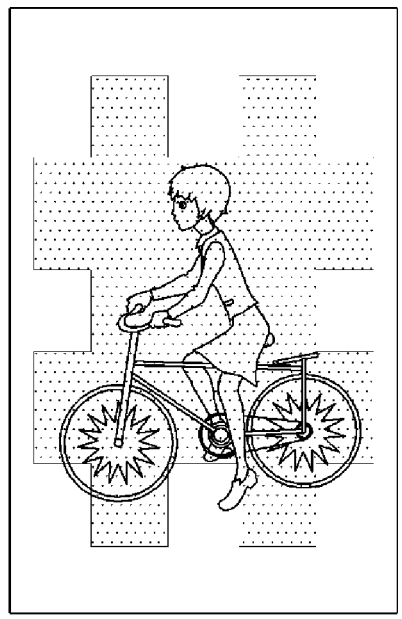
FIGS. 5A and 5B are diagrams illustrating a golden-section exposure measuring method according to an embodiment of the present invention.
Figure 5B:
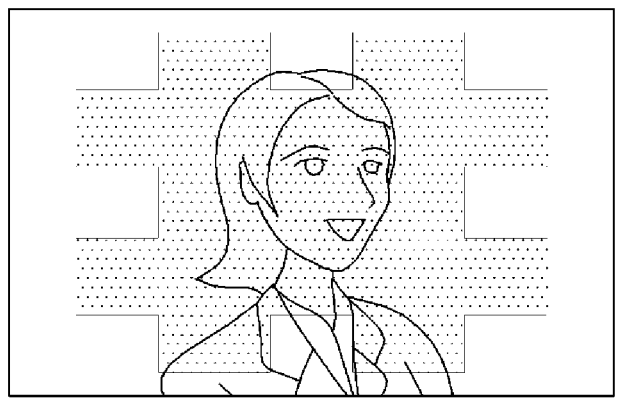

FIGS. 5A and 5B are diagrams illustrating a golden-section exposure measuring method according to an exemplary embodiment of the present invention.

The exposure amount measuring unit 220 may measure the exposure amount with respect to a region set in a sharp sign shape (#) according to the image size, not only based on the triangular composition, the inverted triangular, and the circular composition, but also based on the golden-section composition.

For example, the exposure amount measuring unit 220 may measure the exposure amount of pixels adjoining the line segments of the sharp sign shape among the pixels included in the region set in the sharp sign shape, as shown in FIGS. 5A and 5B. Here, the pixels located at the boundaries of the image may be excluded from the measurement. When the exposure degree of the object is measured using the golden-section exposure measuring method, any measurement with respect to the background may be omitted. Therefore, the exposure amount of the object can be measured more accurately.

Figure 6:
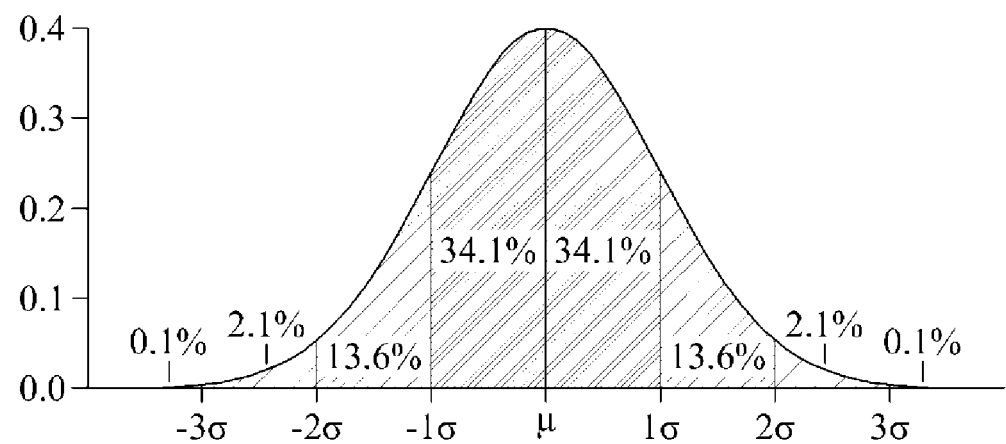
FIG. 6 is a diagram illustrating a normal distribution according to an embodiment of the present invention.
Figure 7:
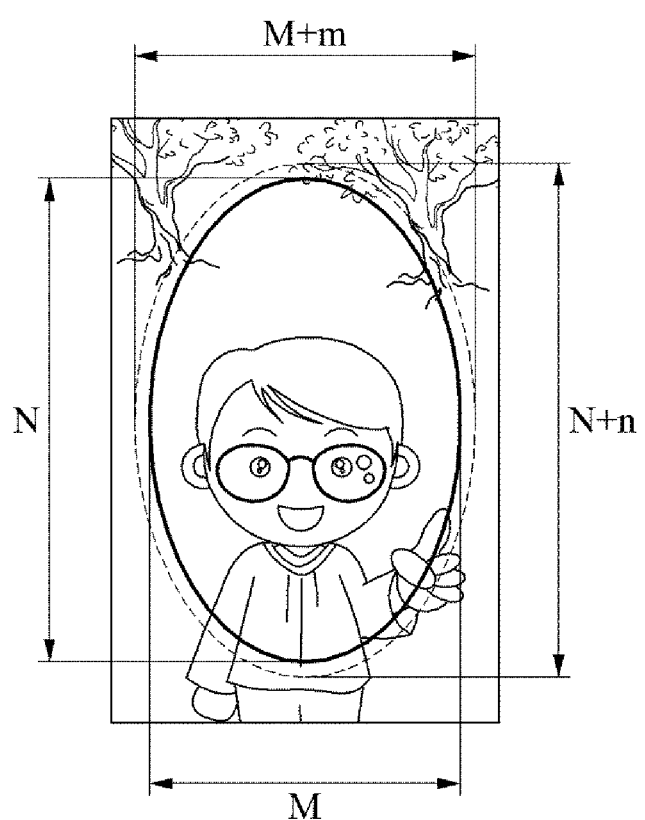
FIG. 7 is a diagram illustrating a region applying histogram stretching according to an embodiment of the present invention.

FIG. 6 is a diagram illustrating a normal distribution according to an exemplary embodiment of the present invention. FIG. 7 is a diagram illustrating a region where histogram stretching is applied according to an exemplary embodiment of the present invention.

When the exposure degree is determined after the exposure amount is measured with respect to the pixels to be measured, the brightness of the pixels may comply with the normal distribution as shown in FIG. 6 because the brightness according to a normal distribution is often found naturally. Therefore, the exposure degree determining unit 230 may determine the exposure degree of the object based on the ratio of pixels of which the exposure amount does not comply with the normal distribution among the measured pixels. That is, the ratio of the pixels that do not comply with the normal distribution may indicate the exposure degree.

In accordance with one embodiment, the composition-based exposure measuring apparatus 200 may further include an image correction unit to correct the input image using histogram stretching based on the exposure degree of the object, which may be determined through the aforementioned process.

In this case, the image correction unit may correct the image by performing the histogram stretching using the maximum brightness value and the minimum brightness value of the image, and the brightness values of the peripheral region of a predetermined region.

For example, the image correction unit may correct the image using the histogram stretching with respect to a region having a width M and a height N (here, M and N are natural numbers). Generally, the histogram stretching is designed to stretch the maximum brightness value and the minimum brightness value within an object region, which is, for example, a region detected as including an object, to a target maximum brightness value and a target minimum brightness value according to the ratio. However, when the image is corrected using the brightness values of only a particular region, correction degrees may be largely varied according to respective regions in the entire image, thereby causing a side effect such as blocking artifacts. Therefore, the image correction unit may correct the image using the maximum brightness value and minimum brightness value of the entire image and the brightness values of the peripheral region of the predetermined region, thereby preventing such blocking artifacts. Also, as shown in FIG. 7, when applying the histogram stretching, the image correction unit may add the peripheral pixels having a width m and a height n (here, m and n are real numbers) to the region having the width M and the height N, so that the difference in the brightness value of the object with respect to the peripheral region is reduced.

Figure 8:
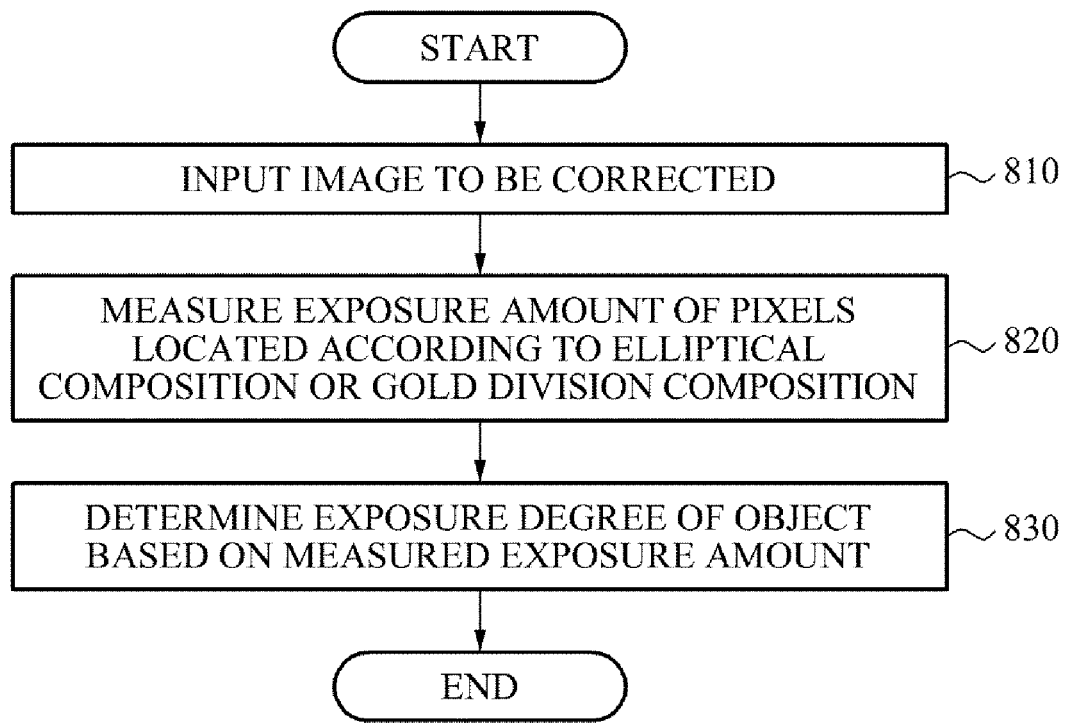
FIG. 8 is a flow chart illustrating a composition-based exposure measuring method according to an embodiment of the present invention.

FIG. 8 is a flow chart illustrating a composition-based exposure measuring method according to an exemplary embodiment of the present invention. Hereinafter, a process of measuring the exposure degree of an object included in the image using the composition-based exposure measuring method according to the exemplary embodiment of the present invention will be described.

First, the composition-based exposure measuring apparatus receives the input of an image in step 810, and measures the exposure amount of the pixels located within a region determined based on a composition among the pixels of the input image in step 820. In addition, the composition-based exposure measuring apparatus may determine the exposure degree of the object based on the measured exposure amount in step 830.

For instance, the determined region may be set in an elliptical shape according to size of the image and based on at least one of a triangular composition, an inverted triangular composition, and a circular composition. In this case, the composition-based exposure measuring apparatus may calculate a histogram by assigning a weight to each pixel according to distances from the center of the image to individual pixels included in the elliptical region, and then measure the exposure amount of each pixel based on the ratio of a bright area and a dark area in the calculated histogram.

As another example, the determine region may be set in a sharp sign shape (#) according to the size of the image and based on a golden-section composition. In this case, the composition-based exposure measuring apparatus may measure the exposure amount of pixels adjoining line segments forming the sharp sign shape among the pixels included in the region set in the sharp sign shape, and then determine the exposure degree of the object based on the ratio of pixels of which the exposure amount does not comply with the normal distribution among the measured pixels.

After the exposure degree of the object is determined through the foregoing process, the image may be corrected by performing histogram stretching with respect to the determined object using the maximum brightness value and the minimum brightness value of the image, and the brightness values of the peripheral region of the determined region.

Thus, the composition-based exposure measuring method and apparatus for automatic correction of an image measure the exposure degree of the object by measuring the exposure amount of the pixels located in the determined region based on a composition among the pixels of the input image, and determine the exposure degree of the object based on the measured exposure amount. Therefore, the exposure degree may be measured more accurately, thereby increasing accuracy of image correction. In addition, since the exposure degree is measured, for instance, based on the elliptical weight exposure measuring method or the golden-section exposure measuring method, the object may be correctly detected with relatively few operations.

The composition-based exposure measuring method according to exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A measuring method that uses a processor to measure an exposure of an object included in an image, the method comprising:

receiving an input of the image;

determining a region in the image in which the object is included based on a select composition;

calculating a histogram by assigning a weight to each pixel located in the determined region according to distances from a center of the image;

measuring an exposure amount of the each pixel based on a ratio of a bright area and a dark area in the calculated histogram; and determining an exposure degree of the object based on the measured exposure amount.

2. The measuring method of claim 1, wherein the determined region is set in an elliptical shape according to a size of the image based on the select composition including at least one of a triangular composition, an inverted triangular composition, and a circular composition.

3. The measuring method of claim 1, wherein the select composition is a golden section composition and the determined region is set in a shape of a sharp sign according to a size of the image.

4. The measuring method of claim 1, further comprising correcting the image using histogram stretching based on the determined exposure degree of the object.

5. The measuring method of claim 4, wherein the correcting of the image comprises:

performing the histogram stretching using a maximum brightness value and a minimum brightness value of the image, and brightness values of a peripheral region of the determined region.

6. A measuring method, using a processor, for measuring an exposure of an object in an image, the method comprising:

receiving an input of the image;

determining a region in the image in which the object is included based on line segments forming a shape of a sharp sign;

measuring an exposure amount of pixels in the line segments forming the shape of the sharp sign among pixels included in the region set in the shape of the sharp sign; and determining an exposure degree of the object based on the measured exposure amount.

7. The measuring method of claim 6, wherein the determining of the exposure degree of the object comprises taking a ratio of pixels among measured pixels having the measured exposure amount not complying with a predetermined normal distribution of brightness.

8. A non-transitory computer-readable recording medium comprising an executable program, when executed by a computer, causes performance of the following steps:

receiving an input of an image;

determining a region in the image in which the object is included based on a select composition;

calculating a histogram by assigning a weight to each pixel located in the determined region according to distances from a center of the image;

measuring an exposure amount of the each pixel based on a ratio of a bright area and a dark area in the calculated histogram; and determining an exposure degree of the object based on the measured exposure amount.

9. The computer-readable recording medium of claim 8, wherein the determined region is set in an elliptical shape according to a size of the image based on the select composition including at least one of a triangular composition, an inverted triangular composition, and a circular composition.

10. The computer-readable recording medium of claim 8, wherein the program further comprises correcting the image using histogram stretching based on the determined exposure degree of the object.

11. A non-transitory computer-readable recording medium storing a program, when executed by a computer, performs the steps comprising:

receiving an input of the image;

determining a region in the image in which the object is included based on line segments forming a shape of a sharp sign;

measuring an exposure amount of pixels in the line segments forming the shape of the sharp sign among pixels included in the region set in the shape of the sharp sign, and determining an exposure degree of the object based on the measured exposure amount.

12. An apparatus to measure an exposure of an object included in an image, the apparatus comprising:

an image input unit configured to receive an input of the image;

an exposure amount measuring unit configured to determine a region in the image in which the object is included based on a select composition, calculate a histogram by assigning a weight to each pixel located in the determined region according to distances from a center of the image, and measure the exposure amount of each pixel based on a ratio of a bright area and a dark area in the calculated histogram;

a data storage device configured to store information of the measured exposure amount; and an exposure degree determining unit configured to determine an exposure degree of the object based on the measured exposure amount.

13. The measuring apparatus of claim 12, wherein the determined region is set in an elliptical shape according to a size of the image based on the select composition including at least one of a triangular composition, an inverted triangular composition, and a circular composition.

14. The measuring apparatus of claim 12, wherein the select composition is a golden section composition and the determined region is set in a shape of a sharp sign according to a size of the image.

15. The measuring apparatus of claim 12, further comprising an image correction unit configured to correct the image using histogram stretching based on the determined exposure degree of the object.

16. The measuring apparatus of claim 15, wherein the image correction unit is further configured to perform the histogram stretching using a maximum brightness value and a minimum brightness value of the image, and brightness values of a peripheral region of the determined region.

17. An apparatus for measuring an exposure of an object included in an image, the apparatus comprising:

an image input unit configured to receive an input of the image;

an exposure amount measuring unit configured to determine a region in the image in which the object is included based on line segments forming a shape of a sharp sign, measure an exposure amount of pixels in the line segments forming the shape of the sharp sign among pixels included in the region set in the shave of the sharp sign; and an exposure degree determining unit configured to determine the exposure degree of the object based on the measured exposure amount.

18. The measuring method of claim 17, wherein the exposure degree of the object is determined by taking a ratio of pixels among measured pixels having the measured exposure amount not complying with a predetermined normal distribution of brightness.

* * * * *